(12) United States Patent
Meijers et al.

(10) Patent No.: US 7,821,590 B2
(45) Date of Patent: Oct. 26, 2010

(54) ASSEMBLY STRUCTURE AND PROCESS FOR A BACKLIGHT DEVICE OF A DISPLAY SYSTEM

(75) Inventors: Jan Mathijs Meijers, Heerlen (NL); Hendrik Thijs Tjarco Boelkens, Heerlen (NL); Michel Ronald José van Wordragen, Heerlen (NL)

(73) Assignee: TPO Displays Corp., Chu-Nan (TW)

( * ) Notice: Subject to any disclaimer, the term of this patent is extended or adjusted under 35 U.S.C. 154(b) by 786 days.

(21) Appl. No.: 11/697,613

(22) Filed: Apr. 6, 2007

(65) Prior Publication Data

US 2008/0247174 A1    Oct. 9, 2008

(51) Int. Cl.
G02F 1/1333 (2006.01)
G02F 1/1335 (2006.01)
F21V 7/04 (2006.01)

(52) U.S. Cl. .................. 349/58; 349/62; 349/122; 362/606; 362/607

(58) Field of Classification Search ............... 349/58
See application file for complete search history.

(56) References Cited

U.S. PATENT DOCUMENTS 5,999,238 A * 12/1999 Ihara .................. 349/58
2004/0141103 A1 * 7/2004 Kotchick et al. ........ 349/61
2006/0125981 A1 * 6/2006 Okuda .................. 349/110

FOREIGN PATENT DOCUMENTS

JP    2005024774    1/2005

OTHER PUBLICATIONS

CN 20081008954.6. Office Action, Sep. 11, 2009, Jan Mathijs Meijers.

* cited by examiner

Primary Examiner—David Nelms
Assistant Examiner—W. Patty Chen
(74) Attorney, Agent, or Firm—Baker & McKenzie LLP

(57) ABSTRACT

A backlight device comprises a mounting case and a stack of optical sheets attached to one another. The attached optical sheets includes at least a first optical sheet adhered with one or more tabs protruding from a side edge of a second optical sheet. The prearranged stack of attached optical sheets is assembled with the mounting case with one single placement operation conducted by one operator.

12 Claims, 7 Drawing Sheets

ASSEMBLY STRUCTURE AND PROCESS FOR A BACKLIGHT DEVICE OF A DISPLAY SYSTEM

FIELD OF THE INVENTION

The present invention generally relates to the manufacture of backlight devices, and more particularly to the assembly of optical components in a backlight device for a liquid crystal display.

DESCRIPTION OF THE RELATED ART

Transmissive and transflective liquid crystal displays conventionally use a backlight device to illuminate a liquid crystal panel from behind, i.e. opposite to the viewer side. Light produced by the backlight travels through the liquid crystal panel where it is modulated to generate an image display on the viewer side.

A conventional backlight device incorporates many components mounted within a mounting case, including a light-emitting source (often light-emitting diodes or fluorescent lamps) and optical sheets such as prism sheets, a light guide plate, and a rim sheet. The assembly of these optical components in the backlight device usually requires a number of restrictions. First, the optical components have to be assembled in a restrictive working environment free of dust or other contaminants that may affect the optical properties of the backlight components. In addition, the assembled optical sheets must be able to freely expand and contract under varying conditions of temperature and humidity in order to release an induced thermal stress that may affect the optical properties of the optical sheets. Thus, in a conventional assembly process, the optical sheets are placed in the mounting case detached from one another in successive order. In this assembly process, each optical sheet is mounted by a separate operator in the backlight device, which then moves on to a next operator for assembling a next optical sheet.

The foregoing sequential assembly of the optical sheets has a number of disadvantages. First, as many operators work in series to successively mount each optical sheet in a backlight unit, the handling time for each operator being relatively short, buffers are conventionally needed to ensure a correct progress from an upstream operator to a downstream operator. As a result, the assembly process is less efficient. Second, multiple handling operations by many operators increase the risk of contamination by dust or finger prints as well as scratch damages and misalignment of the optical sheets, which adversely lowers the yield. Furthermore, the assembly of separate optical sheets requires that each optical sheet be separately packaged to prevent contamination or damages before it is assembled in the backlight unit, which incurs extra waste of packaging materials.

Therefore, what is needed is an improved assembly structure and process that can overcome the problems of the prior art and increase the manufacture efficiency with a reduced cost.

SUMMARY OF THE INVENTION

The application describes an assembly structure and process for assembling a backlight device.

In an embodiment, the backlight device comprises a mounting case and a stack of optical sheets attached to one another. The attached optical sheets includes at least a first optical sheet adhered with one or more tab protruding from a side edge of a second optical sheet. The prearranged stack of attached optical sheets is assembled with the mounting case with one single placement operation conducted by one operator.

The assembly structure and process according to the present invention advantageously simplify the assembly of optical sheets in the backlight device and reduce the manufacturing cost.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF THE EMBODIMENTS

Figure 1A:
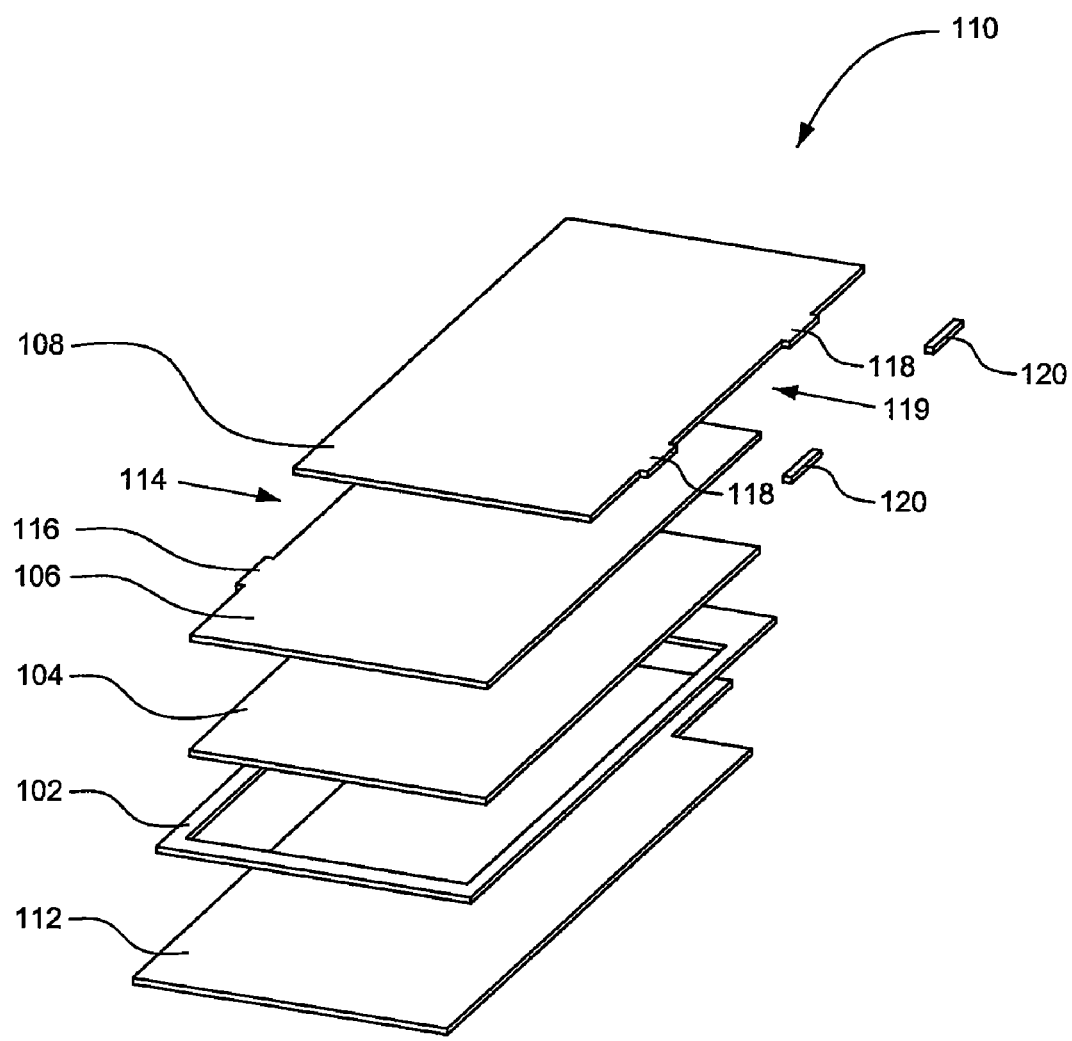
FIG. 1A is an exploded view showing a stack of optical sheets attached to one another according to one embodiment of the invention.
Figure 1B:
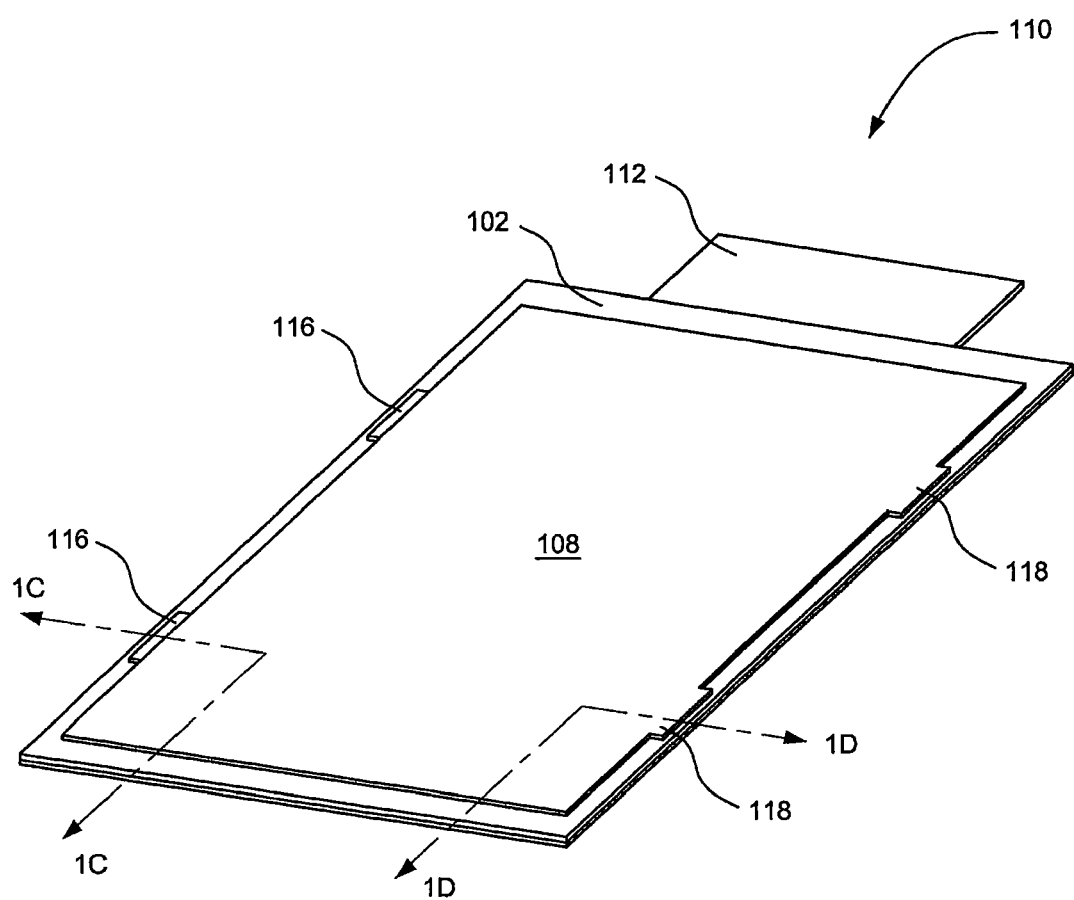
FIG. 1B is a perspective view of a stack of attached optical sheets according to an embodiment of the invention.

The application describes an assembly structure and process of a backlight device that can reduce its manufacture cost and increase the assembly efficiency. In particular, the present invention provides an assembly structure and process in which optical sheets are prearranged in stack units of attached sheets. Each stack of attached optical sheets then can be assembled in one backlight unit with one single operation.

FIGS. 1A through 1D are schematic views illustrating the assembly of optical sheets for a backlight device according to an embodiment of the invention. The optical sheets to be included in the backlight device may include, for example, a rim sheet 102, a light-diffuser sheet 104, a vertical prism sheet 106 and a horizontal prism sheet 108, which are respectively aligned and placed over one another to form a stack of optical sheets, generally designated with reference number 110. The stack 110 may also include a protection foil 112 placed below the rim sheet 102. The rim sheet 102 has an opaque peripheral area that extends beyond the borders of the light-diffuser sheet 104 and vertical and horizontal prism sheets 106 and 108 for preventing light leakage at the borders of the stack of optical sheets 110. The light-diffuser sheet 104 may include a light guide element used to guide and diffuse light. The vertical and horizontal prism sheets 106 and 108 are configured to control the direction of light propagation. The illustrated stack of optical sheets 110 has a generally rectangular shape to accommodate conventionally rectangular display panels; however, any shapes may be suitable. In addition, the present invention may be suitable for assembling any optical sheets other than the above instances of optical sheets.

Figure 1C:
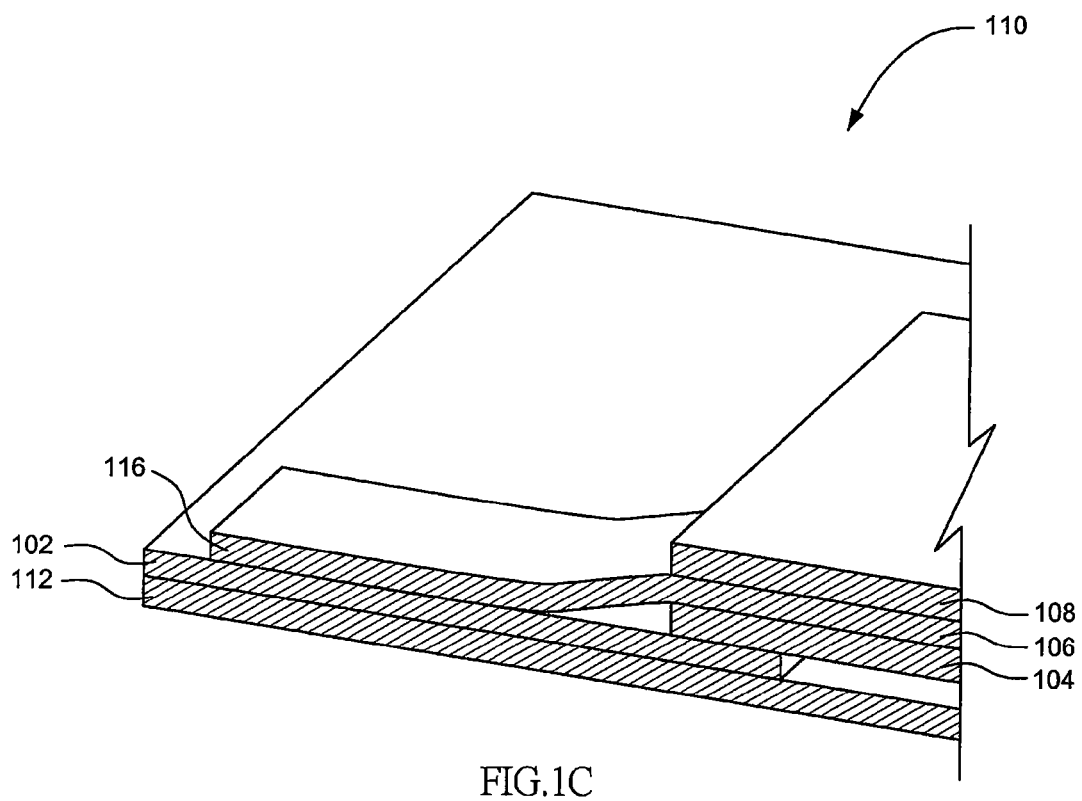
FIG. 1C is a cross-sectional view taken along section 1C in FIG. 1B.
Figure 1D:
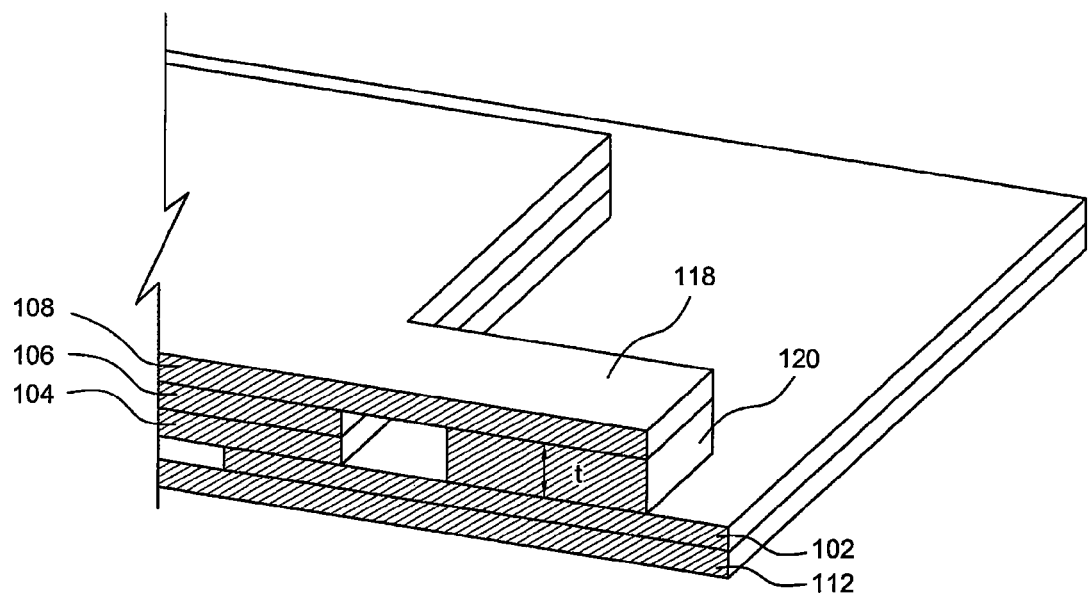
FIG. 1D is a cross-sectional view taken along section 1D in FIG. 1B.

According to the present invention, before it is assembled in a backlight unit, the stack 110 is prearranged with all the optical sheet components attached to one another. FIGS. 1C and 1D are cross-sectional views showing how the optical sheets are joined to form a stack of attached optical sheets according to one embodiment of the invention. Referring to FIG. 1C, the light-diffuser sheet 104 is securely glued to the rim sheet 102 all around the boundary area of the sheet 104. The vertical prism sheet 106 is stacked on the light-diffuser sheet 104 opposite the side of the rim sheet 102. The vertical prism sheet 106 is configured to join with the rim sheet 102 and remain free of attachment relative to the light-diffuser sheet 104. For this purpose, two tabs 116 extend from one side edge 114 of the vertical prism sheet 106 beyond a corresponding border of the light-diffuser sheet 104 to glue to the underlying rim sheet 102. The tabs 116 may be cut out from the material of the prism sheet 106. The adhesion of the vertical prism sheet 106 through localized tabs 116 allows free sheet expansion or contraction of the vertical prism sheet 106 under varying thermal conditions to release the thermal stress and avoid optical artifacts. A person skilled in the art will appreciate that any numbers or modified shapes of the tabs 116 may be possible.

As shown in FIG. 1D, the horizontal prism sheet 108 is stacked on the vertical prism sheet 106 opposite the side of the light-diffuser sheet 104. The horizontal prism sheet 108 is configured to join with the rim sheet 102 and remain free of attachment relative to the other optical sheets of the stack 110. For this purpose, two tabs 118 extend from one side edge 119 of the horizontal prism sheet 108 beyond corresponding borders of the underlying vertical prism sheet 106 and light-diffuser sheet 104. The tabs 118 adhere to the rim sheet 102 through respective glue layers 120. The thickness "t" of the glue layers 120 may be configured to cushion the accumulated thickness of the vertical prism sheet 106 and light-diffuser sheet 104, so that the tabs 118 do not bend downward from an excessive height to adhere with the rim sheet 102. To allow more convenient gluing operations, the side 119 where the horizontal prism sheet 108 attaches with the rim sheet 102 is preferably different from the side 114 where the adjacent vertical prism sheet 106 attaches with the rim sheet 102. In the illustrated embodiment, the side 114 where the vertical prism sheet 106 attaches with the rim sheet 102 is exemplary opposite the side 119 where the horizontal prism sheet 108 attaches with the rim sheet 102. The adhesion of the horizontal prism sheet 108 through localized tabs 118 to the rim sheet 102 allows its free expansion or contraction of horizontal prism sheet 108 relative to the other sheets under varying thermal conditions to release the thermal stress and avoid optical artifacts.

Though the foregoing illustration describes a particular number of optical sheets in one stack, more optical sheets may be added and attached if required. As the optical sheets are prearranged in stacks of aligned and joined optical sheets, the assembly of the optical sheets in the backlight unit can be conducted with one simple placement by a single operator of the glued stack in a mounting case of the backlight unit. Because no optical sheets are separately handled during the backlight assembly, the problems encountered in the prior art, such as operators-induced contaminations, scratch damages or misalignment of the optical sheets, are alleviated. Therefore, the manufacture cost can be reduced and the yield increased.

Figure 2:
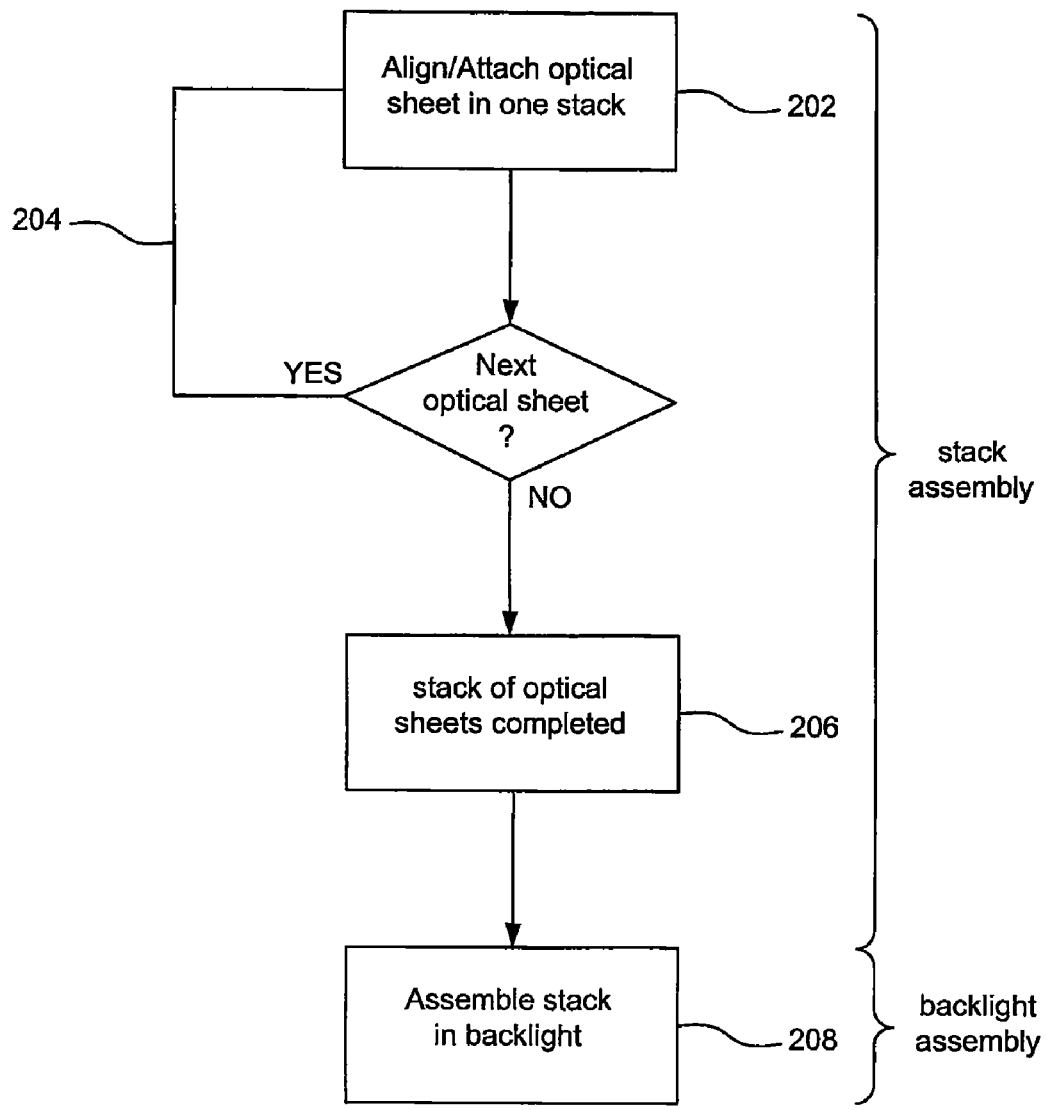
FIG. 2 is a flowchart of an assembly process for a backlight device according to one embodiment of the invention.

Reference now is made to FIG. 2 in conjunction with FIGS. 1A through 1D to describe a process for assembling a backlight device according to one embodiment of the invention. For the purpose of illustration, in the present example, various steps are described in a particular order; however, when supported by accompanying equipment, these steps can be performed in any order, serially or in parallel.

Initially, in step 202, a stack of optical sheets is built up by successively aligning and attaching optical sheets. For example, one provided optical sheet may be configured as the vertical prism sheet 106 shown in FIGS. 1A through 1D, with one or more tabs 116 that extend from one side edge of the optical sheet and adhere with an underlying sheet 102 to form stack 110. Step 202 is repeatedly conducted for each additional optical sheet (such as the horizontal prism sheet 108) to incorporate in the stack, as indicated by loop 204. Preferably, the optical sheets added in the stack are attached at alternated sides. Once the last optical sheet is attached, the resulting stack of optical sheets is completed in step 206. Subsequently, in step 208, the completed stack of attached optical sheets can be assembled in a mounting case of a backlight unit.

In an exemplary application of the method described above, steps 202 through 206 may be conducted on one stack assembly line that supplies stacks of attached optical sheets. In turn, step 208 may be conducted on another backlight assembly line where the stacks of optical sheets are received and mounted in backlight units. The stack assembly line and backlight assembly line may be processed in parallel or series. As stacks of grouped optical sheets, rather than separate optical sheets, are shipped from the stack assembly line to the backlight assembly line, the packaging material and requisite carrying equipment for the optical sheet stacks can be advantageously reduced.

Figure 3:
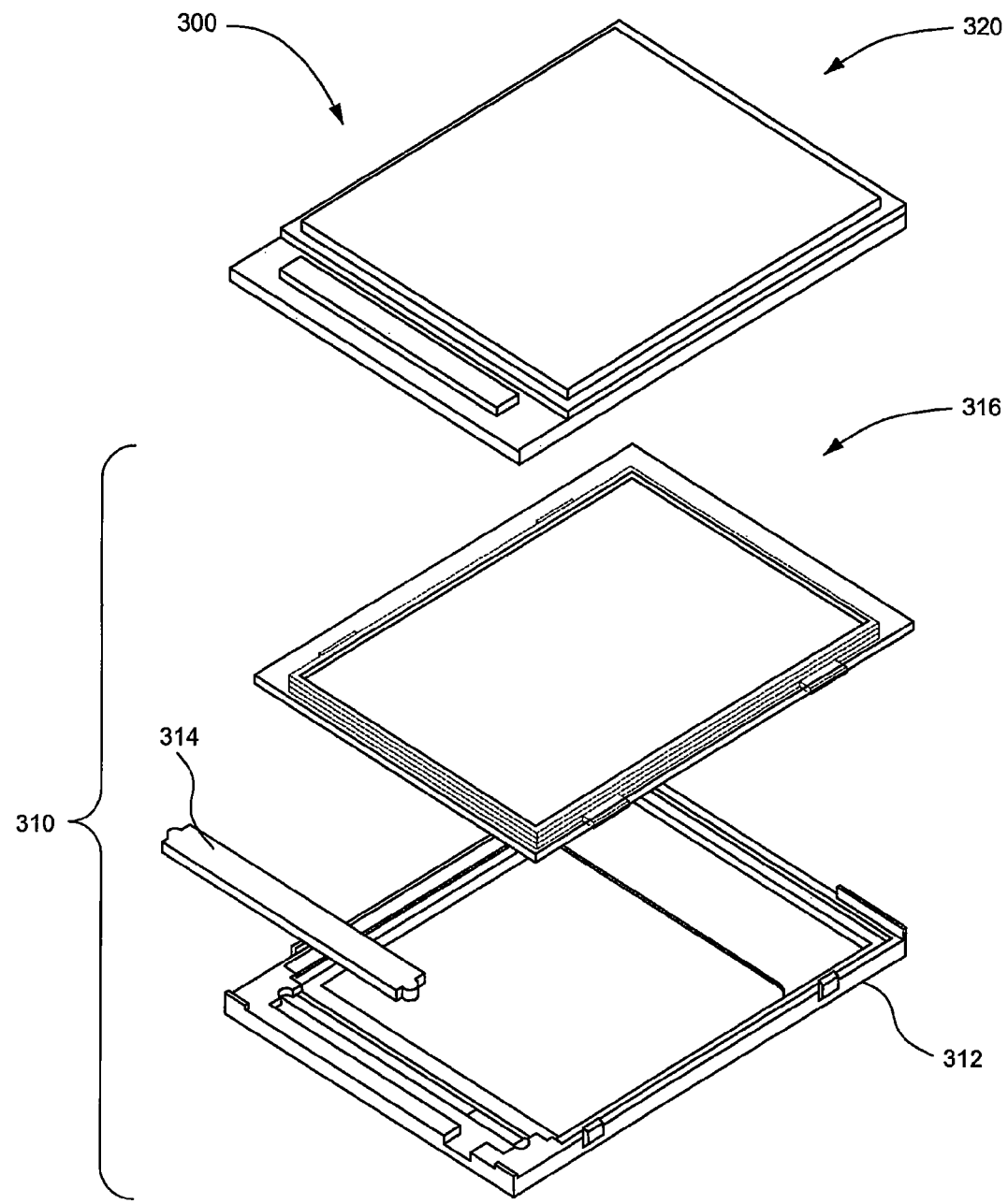
FIG. 3 is a schematic view of the assembly of a liquid crystal display panel including a backlight device in accordance with an embodiment of the present invention.

FIG. 3 is a schematic view of a display panel assembly incorporating a backlight unit constructed according to an embodiment of the invention. Reference number 300 generally designates the display system, which includes a backlight unit 310 and a liquid crystal panel 320 assembled to each other. The backlight unit 310 includes a mounting case 312 in which are secured a light source 314 and a stack of attached optical sheets 316. The stack 316 is mounted with the rim sheet facing up to attach with the liquid crystal panel 320. Light emitted from the light source 314 thus travels through the stack of optical sheets 316 before reaching the liquid crystal panel 320.

Figure 4:
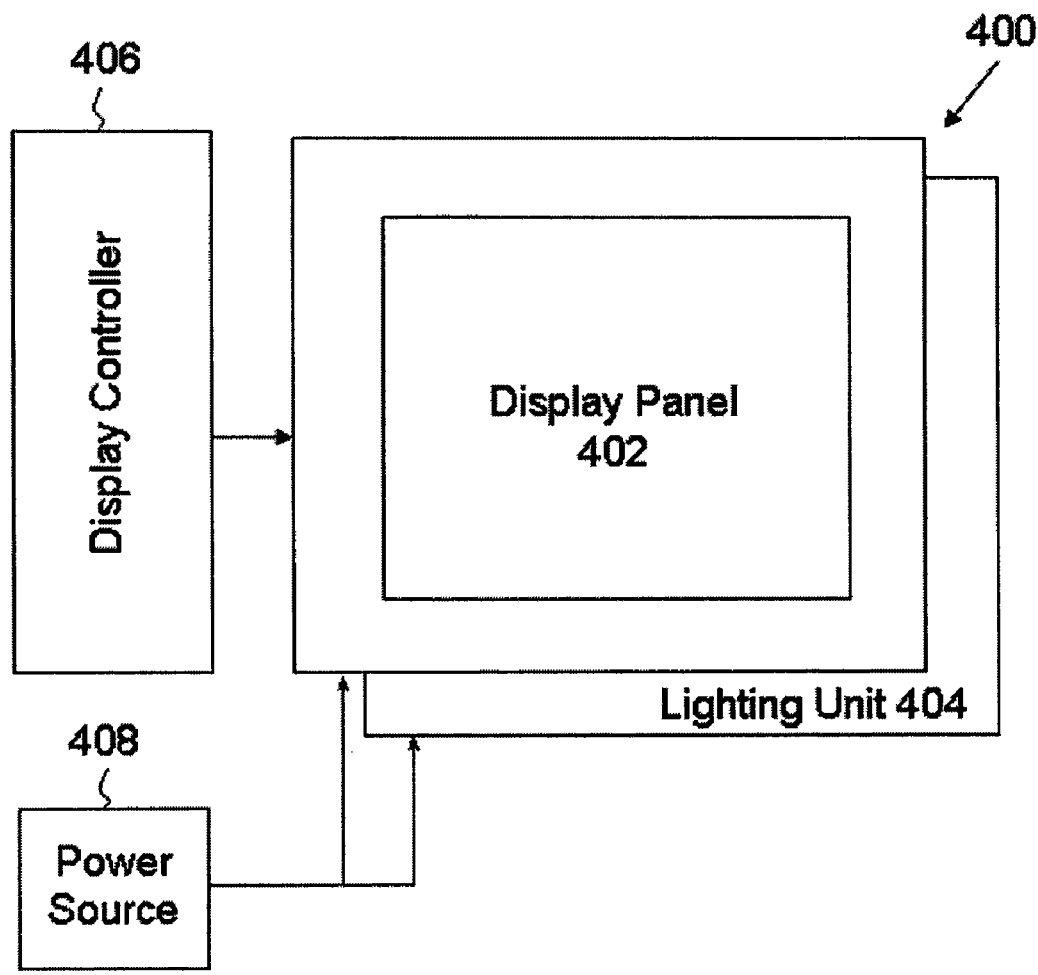
FIG. 4 is a conceptual diagram of a display system according to one or more aspects of the invention.

FIG. 4 is a conceptual diagram of a display system according to one or more aspects of the invention. The display system may be implemented in any electric appliances, including, but not limited to, portable handheld devices such as portable multimedia players (such as DVD players), mobile phones, digital cameras, personal digital assistants (PDA), desktop computer monitors, television sets, in-car displays, laptop computers, or the like. Display system 400 includes a display panel 402, lighting unit 404, display controller 406 and power source 408. The display controller 406 transmits input data and various control signals to the display panel 402 for generating an image display on the display panel 402. The lighting unit 404 may be similar in structure as any of the backlight unit embodiments described above, and is suitably configured to illuminate the display panel 402 operating in a lighting mode. Power required for the operation of the display system 400 is provided by a power source 408 coupled with the display panel 402 and lighting unit 404.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A display system, comprising:
    a display panel;
    a lighting unit coupled with the display panel; and
    a stack of attached optical sheets through which light emitted from the lighting unit travels towards the display panel,
    wherein the stack includes at least a first optical sheet adhered with one or more tabs protruding from a first side edge of a second optical sheet, and one or more optical sheets interposed between the first and second optical sheet, and
    wherein the one or more tabs adhere with the first optical sheet through a glue layer having a thickness that cushions a thickness of the one or more optical sheets interposed between the first and second optical sheet.

2. The display system according to claim 1, wherein the one or more optical sheets interposed between the first and second optical sheet includes a third optical sheet adhered with the first optical sheet.

3. The display system according to claim 2, wherein the third optical sheet adheres with one or more tabs protruding from a second side edge of the third optical sheet.

4. The display system according to claim 3, wherein the first side where the second optical sheet attaches with the first optical sheet differs from the second side where the third optical sheet attaches with the first optical sheet.

5. The display system according to claim 1, further comprising a power source and a display controller configured to supply data signals to the display panel for image display.

6. The display system according to claim 1, being used in a mobile phone, digital camera, personal digital assistant, notebook computer, desktop computer, television, car display, or portable multimedia player.

7. The display system according to claim 1, wherein the first optical sheet is a rim sheet.

8. A stack of attached optical sheets comprising at least a first optical sheet adhered with one or more tabs protruding from a first side edge of a second optical sheet, wherein the stack includes one or more optical sheets interposed between the first and second optical sheet, and wherein the one or more tabs adhere with the first optical sheet through a glue layer having a thickness that cushions a thickness of the one or more optical sheets interposed between the first and second optical sheet.

9. The stack according to claim 8, wherein the one or more optical sheets interposed between the first and second optical sheet includes a third optical sheet adhered with the first optical sheet.

10. The stack according to claim 9, wherein the third optical sheet adheres with the first optical sheet at one or more tabs protruding from a second side edge of the third optical sheet.

11. The stack according to claim 10, wherein the first side where the second optical sheet attaches with the first optical sheet differs from the second side where the third optical sheet attaches with the first optical sheet.

12. The stack according to claim 8, wherein the first optical sheet is a rim sheet.

* * * * *